United States Patent
Bareket et al.

(10) Patent No.: US 9,832,630 B2
(45) Date of Patent: Nov. 28, 2017

(54) RADIO COMMUNICATION DEVICES AND METHODS FOR PERFORMING WIRELESS PEER-TO-PEER DISCOVERY

(71) Applicant: Intel IP Corporation, Santa Clara, CA (US)

(72) Inventors: Raz Bareket, Haifa (IL); Liraz Zur, Haifa (IL); Izoslav Tchigevsky, Portland, OR (US); David Birnbaum, Modiin (IL)

(73) Assignee: INTEL IP CORPORATION, Santa Clara, CA (US)

(*) Notice: Subject to any disclaimer, the term of this patent is extended or adjusted under 35 U.S.C. 154(b) by 150 days.

(21) Appl. No.: 14/948,488

(22) Filed: Nov. 23, 2015

(65) Prior Publication Data
US 2017/0150337 A1    May 25, 2017

(51) Int. Cl.
*H04W 8/00* (2009.01)
*H04W 76/02* (2009.01)
*H04L 29/08* (2006.01)

(52) U.S. Cl.
CPC ........... *H04W 8/005* (2013.01); *H04L 67/104* (2013.01); *H04L 67/28* (2013.01); *H04W 76/023* (2013.01)

(58) Field of Classification Search
CPC ....... H04W 8/00; H04W 8/005; H04W 48/12; H04W 84/12; H04W 76/023; H04L 67/104; H04L 67/128
USPC ........................................................ 370/329
See application file for complete search history.

(56) References Cited

U.S. PATENT DOCUMENTS

| 2003/0016636 | A1* | 1/2003 | Tari ................... H04L 29/12066 370/328 |
| 2006/0019698 | A1* | 1/2006 | Ahya .................... H04W 48/18 455/552.1 |
| 2012/0028638 | A1* | 2/2012 | Mueck .................. H04W 36/18 455/426.1 |
| 2013/0148642 | A1  | 6/2013 | Abraham et al. |
| 2014/0029471 | A1  | 1/2014 | Tavildar et al. |
| 2014/0195607 | A1* | 7/2014 | Kowalewski ....... H04L 65/1016 709/204 |

(Continued)

FOREIGN PATENT DOCUMENTS

| EP | 1865687 A1 | 12/2007 |
| WO | 2014139114 A1 | 9/2014 |

OTHER PUBLICATIONS

The extended European Search Report based on Application No. EP 16194173.7 (10 Pages) dated Mar. 17, 2017 (Reference Purpose Only).

*Primary Examiner* — Afsar M Qureshi
(74) *Attorney, Agent, or Firm* — Viering, Jentschura & Partner mbB

(57) ABSTRACT

A mobile communication device may include a radio transceiver and a baseband processing circuit adapted to interact with the radio transceiver to transmit and receive radio signals. The baseband processing circuit may be configured to provide target criteria to a proxy discovery device, the target criteria characterizing a desired wireless connection of the mobile communication device, receive a proxy report from the proxy discovery device detailing discovery results that satisfy the target criteria, and select a provider device that satisfies the target criteria to establish a wireless connection with based on the proxy report.

25 Claims, 7 Drawing Sheets

(56) References Cited

U.S. PATENT DOCUMENTS

| | | | |
|---|---|---|---|
| 2014/0362728 A1* | 12/2014 | Krochmal | H04B 7/26 370/254 |
| 2015/0382174 A1 | 12/2015 | Guo et al. | |
| 2016/0014601 A1* | 1/2016 | Mellqvist | H04W 12/06 455/411 |
| 2016/0337877 A1* | 11/2016 | Sorrentino | H04W 72/04 |

* cited by examiner

RADIO COMMUNICATION DEVICES AND METHODS FOR PERFORMING WIRELESS PEER-TO-PEER DISCOVERY

TECHNICAL FIELD

Various embodiments relate generally to radio communication devices and methods for performing wireless peer-to-peer discovery.

BACKGROUND

Many wireless communication technologies, including WiFi Direct (also known as WiFi Peer-to-Peer (P2P)), Bluetooth, Wireless Gigabit Alliance (WiGig), Device-to-Device (D2D; in Long Term Evolution (LTE) networks), etc., include "discovery" procedures that allow for devices to wirelessly detect other proximate devices. Proximate devices may then establish a communication link following initial detection, thus allowing the devices to exchange data according to one of the various wireless communication technology protocols. Discovery procedures may therefore be critical in such wireless communication technologies, as proximate devices may first need to "discover" one another before any further data exchange is possible.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
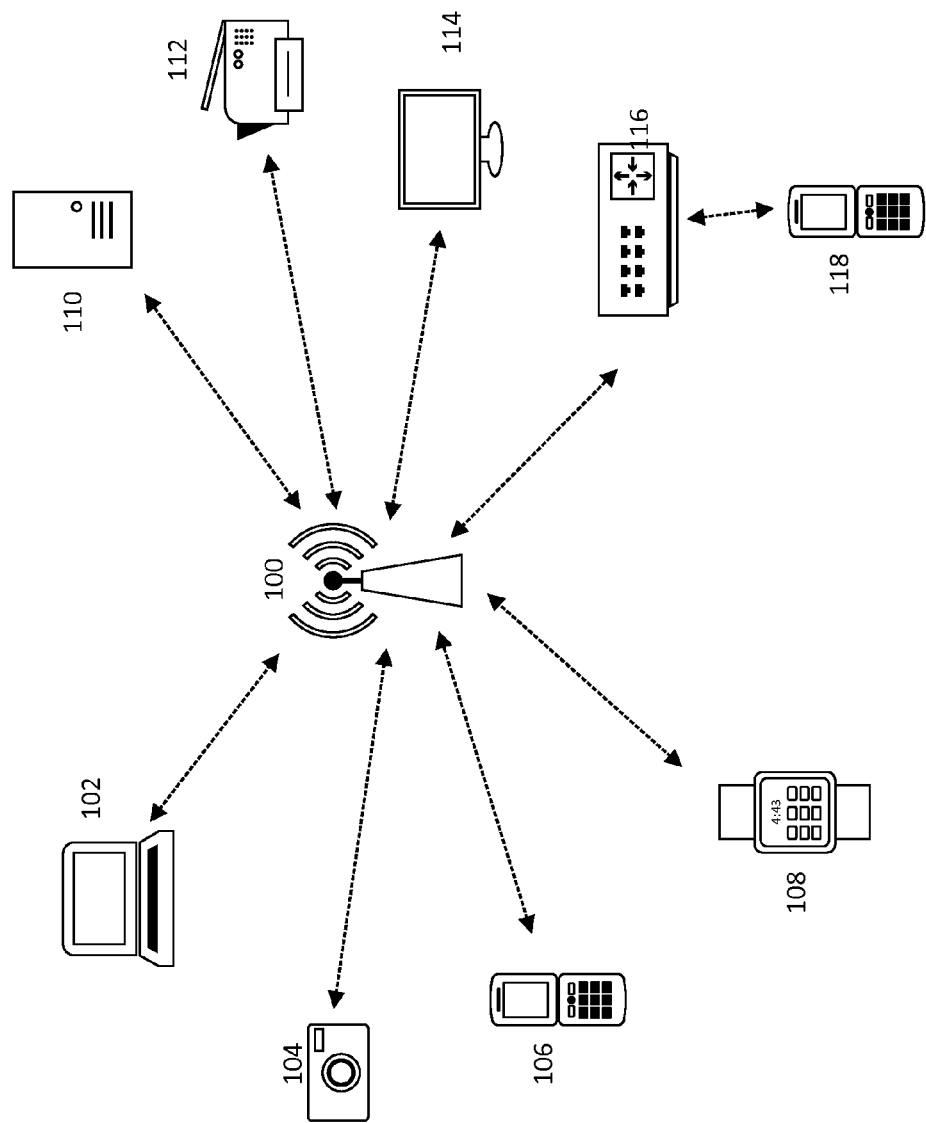
FIG. 1 shows a wireless communication network.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more.

As used herein, a "circuit" may be understood as any kind of logic implementing entity (analog or digital), which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. Accordingly it is understood that references to a "circuit" may refer to two or more circuits that collectively form a single circuit.

A "processing circuit" (or equivalently "processing circuitry") as used herein is understood as referring to any circuit that performs an operation on a signal or signals, such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or nonvolatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component comprising one or more types of memory. It is readily understood that any single memory component may be separated into multiple collectively equivalent memory components, and vice versa. Furthermore, it is appreciated that while memory may be depicted, such as in the drawings, as separate from one or more other components, it is understood that memory may be integrated within another component, such as on a common integrated chip.

The term "base station" used in reference to an access point of a mobile communication network may be understood as a macro base station, micro base station, Node B, evolved NodeBs (eNB), Home eNodeB, Remote Radio Head (RRH), relay point, etc.

As used herein, a "cell" in the context of telecommunications may be understood as a sector served by a base station. Accordingly, a cell may be a set of geographically co-located antennas that correspond to a particular sectorization of a base station. A base station may thus serve one or more cells (or sectors), where each cell is characterized by a distinct communication channel. Furthermore, the term "cell" may be utilized to refer to any of a macrocell, microcell, femtocell, picocell, etc.

It is appreciated that the ensuing description may detail exemplary scenarios involving mobile device operating according to certain 3GPP (Third Generation Partnership Project) specifications, notably Long Term Evolution (LTE) and Long Term Evolution-Advanced (LTE-A). It is understood that such exemplary scenarios are demonstrative in nature, and accordingly may be similarly applied to other mobile communication technologies and standards, such as WLAN (wireless local area network), WiFi, UMTS (Universal Mobile Telecommunications System), GSM (Global System for Mobile Communications), Bluetooth, CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

For purposes of this disclosure, radio communication technologies may be classified as one of a Short Range radio communication technology, Metropolitan Area System radio communication technology, or Cellular Wide Area radio communication technology. Short Range radio communication technologies include Bluetooth, WLAN (e.g. according to any IEEE 802.11 standard), and other similar radio communication technologies. Metropolitan Area System radio communication technologies include Worldwide Interoperability for Microwave Access (WiMax) (e.g. according to an IEEE 802.16 radio communication standard, e.g. WiMax fixed or WiMax mobile) and other similar radio communication technologies. Cellular Wide Area radio communication technologies include GSM, UMTS, LTE, LTE-Advanced (LTE-A), CDMA, WCDMA, LTE-A, General Packet Radio Service (GPRS), Enhanced Data Rates for GSM Evolution (EDGE), High Speed Packet Access (HSPA), HSPA Plus (HSPA+), and other similar radio communication technologies.

The term "network" as utilized herein, e.g. in reference to a communication network such as a mobile communication network, is intended to encompass both an access component of a network (e.g. a radio access network (RAN) component) and a core component of a network (e.g. a core network component).

As utilized herein, the term "radio idle mode" or "radio idle state" used in reference to a mobile terminal refers to a radio control state in which the mobile terminal is not allocated at least one dedicated communication channel of a mobile communication network. The term "radio connected mode" or "radio connected state" used in reference to a mobile terminal refers to a radio control state in which the mobile terminal is allocated at least one dedicated uplink communication channel of a mobile communication network.

Unless explicitly specified, the terms "transmit" and "send" encompass both direct and indirect transmission/sending. Similarly, the term "receive" encompasses both direct and indirect reception unless explicitly specified.

Due to emerging technological developments such as Machine to Machine (M2M) communications and the Internet of Things (IoT), many consumer and commercial electronic devices may be equipped with wireless communication capabilities on one or more wireless networks. Accordingly, many devices may be configured to wirelessly detect and communicate with other devices on certain wireless networks, which may provide users with a wide array of new device features and functionalities.

Devices with wireless capabilities may exchange data with each other using any number of established wireless communication protocols. Many of these wireless communication protocols, including WiFi Direct (also known as WiFi Peer-to-Peer (P2P)), Bluetooth, Wireless Gigabit Alliance (WiGig), Device-to-Device (D2D; in Long Term Evolution (LTE) networks), include "discovery" procedures in which devices may wirelessly broadcast their availability to any proximate devices. Proximate devices may then wirelessly detect broadcasting devices as part of the discovery process and, if desired, may proceed to establish a wireless communication session with the broadcasting device in which both the broadcasting device and discoverer device may exchange wireless data.

The detection of proximate devices during discovery procedures may be essential to such wireless communication protocols, as failed discovery proceedings may preclude a subsequent wireless connection to exchange data. The likelihood that a given device is discovered by a proximate device may depend on the amount of time that the given device spends attempting to be discovered, e.g. broadcasting discovery signals and/or attempting to detect discovery signals from other devices (including e.g. transmitting, receiving, and responding to probe requests). For example, discovery procedures may rely on a second device detecting a discovery signal (e.g. a "beacon"-type signal utilized for discovery) transmitted by a first device, thus allowing the second device to detect or "discover" the first device. The first device may need to transmit a discovery signal during the same period of time in which the second device is monitoring for discoverable devices. The first device may therefore increase the probability of being discovered by frequently transmitting discovery signals and/or monitoring for other discoverable devices.

Many devices may be classified as either "requestor" devices or "provider" devices. Provider devices may provide certain services to requestor devices (and optionally other provider devices), such as Internet or Cloud access, file sharing, presentation and/or playback capabilities (e.g. video, audio, or image), location information (e.g. a "check-in" feature), etc. Such provider devices may advertise the supported services as part of discovery procedures, where a requestor device may read a discovery signal from a provider device or exchange preliminary information with a provider device in order to determine the exact services provided by a given provider device.

In contrast, requestor devices may seek to utilize certain services offered by provider devices, such as by utilizing Internet/Cloud access offered by a provider device to access the Internet or Cloud, providing multimedia for presentation or playback, etc. Requestor devices may indicate the desired services to provider devices during discovery procedures in the initial discovery beacon and/or through exchange of preliminary information with a provider device. Accordingly, requestor devices may match with provider devices that supply certain services targeted by the requestor device during discovery procedures, and may proceed to utilize the available services after establishing a wireless communication session with a provider device. It is appreciated that provider and requestor designations are not necessarily mutually exclusive, and any given device may act in both a provider and requestor capacity depending on device configuration.

Many requestor devices may be portable devices, such as mobile phones, laptops, tablets, wearables (e.g. watches/bracelets/necklaces, glasses, earpieces, headsets), or any number of other relatively compact electronic devices with wireless capabilities ranging from keys to lightbulbs to remote controls. Due to the associated mobility of such devices, many requestor devices may rely on a limited internal power source such as battery power as opposed to largely "unlimited" external power sources such as wired AC power, although such is not limiting.

Accordingly, the ability for many requestor devices to perform frequent discovery (i.e. by broadcasting discovery signals and/or, scanning for discovery signals or discovery signal responses from detectable proximate devices, transmitting/receiving/responding to probe requests, etc.) may be constrained by device power. As many discovery procedures, including broadcasting and scanning for discovery signals and discovery signal responses, may have a high power penalty, it may be impractical for battery-powered devices to be constantly engaged in discovery procedures.

Accordingly, in order to limit the battery power expended requestor devices for discovery procedures, one or more "proxy discovery devices" may be provided in order to offload some or all of the discovery process from requestor devices. For example, a requestor device may wish to perform discovery in order to establish a connection with a provider device that offers a desired service. Various examples may include a fitness tracker wearable that wishes to access the Internet or a Cloud-based network (i.e. via a provider device offering Internet or Cloud access) in order to store obtained application data for a user, a multimedia device that wishes to perform audio/video playback (i.e. via a provider device offering multimedia playback), a mobile device that wishes to perform file sharing (i.e. via a provider device offering file sharing services) or printing (i.e. via a smart printer), etc. Accordingly, the requestor device may be seeking provider devices that perform specific desired services, and accordingly may initiate discovery procedures in order to detect and potentially connect to such provider devices.

However, as previously indicated transmitting frequent discovery signals and constantly monitoring for discovery signals from other devices may drain battery power at a requestor device. Accordingly, a proxy discovery device may be provided in order to perform some or all of the discovery process for requestor devices, such as by detecting proximate provider devices via discovery procedures, and report back to the requestor device one or more suitable provider devices for the requestor device to potentially establish a connection with. The proxy discovery device may additionally filter the detected provider devices in order to only report back provider devices that perform relevant services to the requestor device. Additionally, the proxy discovery device may identify certain discovery parameters of provider devices, such as time and frequency scheduling information of the discovery configuration of the provider devices, and may additionally report back such discovery parameters to requestor devices. Requestor devices may then employ the discovery parameters reported by the proxy discovery device in order to optimize the subsequent discovery procedure with a provider device. This optimized discovery procedure using a proxy discovery device may appreciably reduce the power consumption at requestor devices, thus conserving valuable battery power at requestor devices. Furthermore, the proxy discovery device may have a greater power capacity than requestor devices, such as an "unlimited" wired power supply or a large-capacity battery, and accordingly may be more capable of performing frequent or constant discovery procedures.

FIG. 1 shows an exemplary wireless communication network including proxy discovery device 100, requestor devices 102 (e.g. laptop), 104 (e.g. digital camera), 106 (e.g. mobile phone), and 108 (e.g. smart watch), and provider devices 110 (e.g. server), 112 (e.g. wireless printer), 114 (e.g. smart display), 116 (e.g. wireless controller), 118 (e.g. mobile phone). It is appreciated that the aforementioned exemplary devices are not exclusively limited to a provider or requestor role, and that any such device may assume either role depending on the particular service capabilities of any given device. Furthermore, provider and requestor devices may not be excluded from a proxy discovery role, as a proxy discovery device may act as a provider device that provides a proxy discovery, or e.g. where a requestor device performs proxy discovery for another requestor device.

One or more of requestor devices 102-108 may be seeking a particular service, such as requestor device 104 attempting to reproduce multimedia content (e.g. at provider device 114 capable of reproducing audio/video/images) or attempting to store multimedia content over a Cloud service (e.g. at provider device 110 capable of storing data at a Cloud location). Accordingly, requestor device 104 may initiate discovery procedures in order to "discover" a suitable provider device.

In order to increase the likelihood of discovery, requestor device 104 may need to frequently broadcast a discovery signal (which may also include probe requests and responses) and/or listen for discovery signals and discovery responses from any nearby provider devices. As previously indicated, frequency discovery procedures may require high power expenditure by requestor device 104, and may as a result lead to rapid depletion of a battery power source of requestor device 104.

Instead, requestor device 104 may employ proxy discovery device 100 to offload some or all of the discovery procedure, and consequently may allow requestor device 104 to save power due to reduced activity requirements and the ability to utilize low-power or sleep states. Specifically, requestor device 104 may first register with proxy discovery device 100, which may ensure easy discovery by e.g. constantly broadcasting discovery beacons on predefined channels. As proxy discovery device 100 may have an "unlimited" power supply such as an AC power source (or may have a larger-capacity portable power source), proxy discovery device 100 may not be constrained by power limitations that render constant discovery activity by requestor device 104 undesirable. Requestor device 104 may thus easily detect proxy discovery device 100 and establish a connection with proxy discovery device 100, such as by using standard discovery procedures.

Requestor device 104 may then provide proxy discovery device 100 with a "proxy request" detailing target discovery parameters, such as by indicating certain desired services of requestor device 104, (e.g. multimedia reproduction, storage services, Internet/Cloud services, etc.). Proxy discovery device 100 may then identify any proximate devices in addition to determining the specific services offered by each proximate device, such as based on previous discovery scans or by performing a "fresh" discovery scan in order to discover and collect information on any proximate devices. In particular, proxy discovery device 100 may collect information detailing services offered by proximate provider devices. Based on the discovered devices, proxy discovery device 100 may identify one or more provider devices that offer services matching to the services solicited by requestor device 104, such as by identifying provider devices 110 and 114 as offering multimedia reproduction and storage services, respectively.

Proxy discovery device 100 may then provide requestor device 104 with a "proxy report" that characterizes relevant proximate devices (such as e.g. all proximate devices discovered by proxy discovery device 100 and their offered services or limited to provider devices discovered by proxy discovery device 100 that provide services relevant to those requested by requestor device 104). In order to reduce power consumption at requestor device 104, proxy discovery device 100 may provide requestor device 104 with specific scheduling information for the proxy report (such as identifying a specific time frame and channel) that requestor device 104 may utilize in order to easily receive the proxy report without unnecessary scanning. Requestor device 104 may then utilize the proximate devices indicated by proxy discovery device 100 in the proxy report to perform discovery with a target proximate device, such as a provider device identified by proxy discovery device 100 that has matching services to those requested by requestor device 104 (e.g. provider device 110 or 114). Proxy discovery device 100 may additionally identify and report discovery scheduling parameters for identified proximate devices, such as by providing requestor device 104 with specific time frames and/or channels which requestor device 104 may utilize to quickly perform discovery with a target device.

In the event that proxy discovery device 100 does not identify any suitable provider devices for requestor device 104, requestor device 104 may not perform any discovery and may enter an inactive or low-power state. Requestor device 104 may then potentially wait until a later time to inquire proxy discovery device 100 (or e.g. another proxy discovery device if requestor device 104 relocates) about current provider devices or wait until a later time to perform discovery services (e.g. if proxy discovery device 100 is no longer available, and/or no further proxy discovery devices are available). Accordingly, requestor device 104 may conserve battery power by both making an informed decision as to whether to perform discovery (e.g. depending on if proxy discovery device 100 has reported any suitable target devices) and/or by using specific scheduling information provided by proxy discovery device 100 to expedite discovery procedures with a target device. As proxy discovery device 100 may have a greater power capacity than requestor device 104, the relative power penalty on for proxy discovery device 100 may not be problematic.

Figure 2:
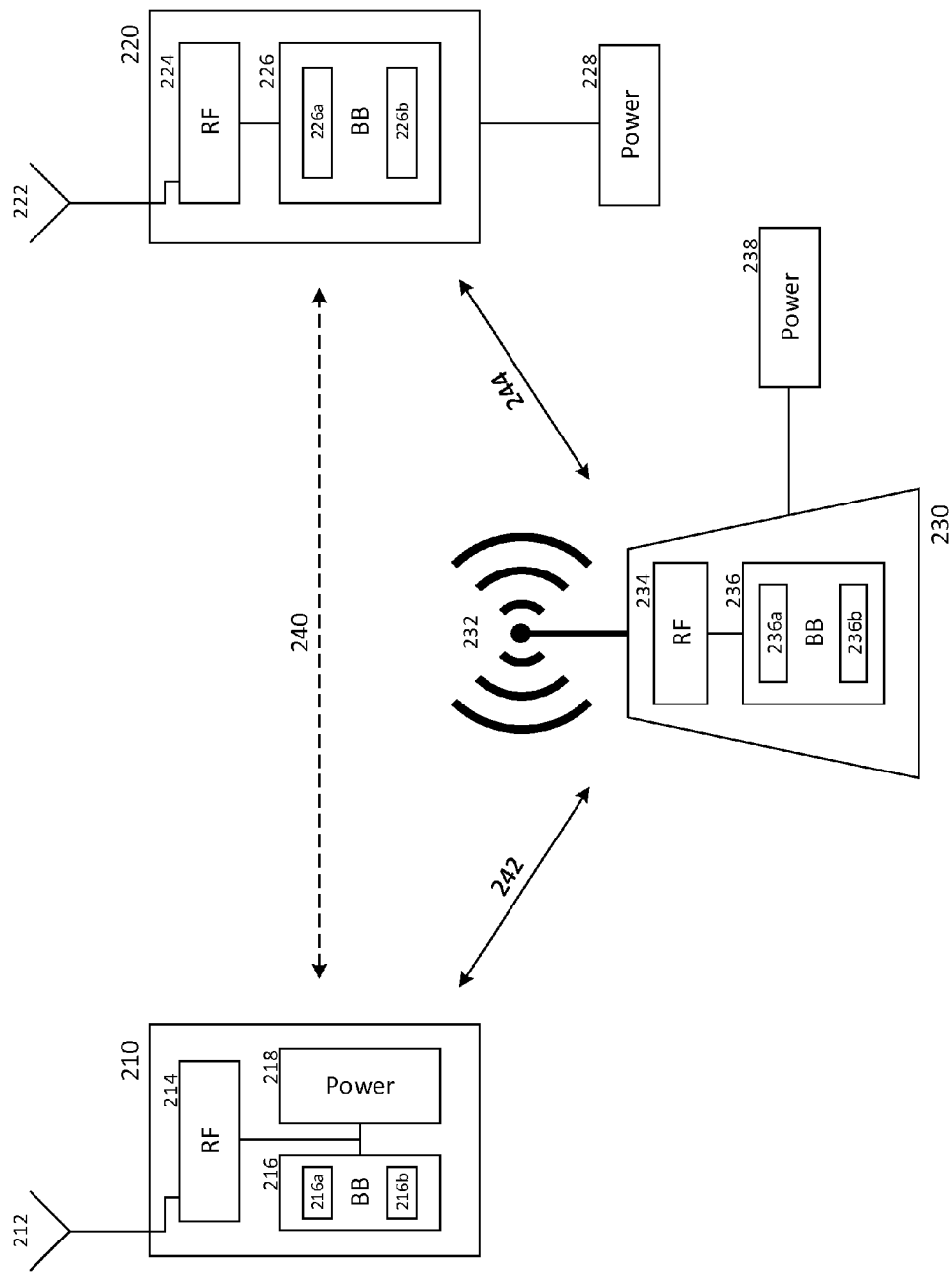
FIG. 2 shows internal configurations of a requestor device, provider device, and proxy discovery device.

FIG. 2 shows a block diagram illustrating a requestor device, proxy device, and provider device network in the context of exemplary wireless network 200 in greater detail. While wireless network 200 may be subsequently described in a WiFi or WiFi Direct context, wireless network 200 may alternatively be any type of wireless network, such as a WiFi network, WiFi Direct network, Bluetooth network, WiGig network, D2D network, or another Short Range, Metropolitan Area System, or Cellular Wide Area radio communication network.

Wireless network 200 may include requestor device 210, provider device 220, and proxy discovery device 230. As shown in FIG. 2, requestor device 210 may include antenna system 212, radio frequency (RF) transceiver 214, baseband circuit 216, and power supply 218. Similarly, provider device 220 may also include antenna system 222, RF transceiver 224, baseband circuit 226, and power supply 228.

As will be detailed, requestor device 210 may be a mobile communication device including an RF transceiver (RF transceiver 214) and a baseband processing circuit (baseband circuit 216) adapted to interact with the RF transceiver to transmit and receive radio signals on a communication network, the baseband processing circuit configured to obtain a channel quality metric for each of the plurality of cells, assign a cell measurement priority ranking to each of the plurality of cells based on the respective channel quality metrics of the plurality of target cells, based on the cell measurement priority rankings, selecting one or more target cells of the plurality of cells to measure during one or more reference signal periods to obtain a plurality of reference signal measurements, and report the plurality of reference signal measurements to a communication network.

Requestor device 210 and provider device 220 may function in substantially similar manners. Requestor device 210/provider device 220 may receive wireless radio frequency signals with antenna system 212/222, which may each be a single antenna or an antenna array composed of multiple antennas. Antenna system 212/222 may transduce received wireless radio frequency signals into electrical radio frequency signals and provide resulting electrical radio frequency signals to RF transceiver 214/224. RF transceiver 214/224 may include various reception circuitry components, which may include analog circuitry configured to process electrical radio frequency signals such as e.g. mixing circuitry to convert received electrical radio frequency signals to baseband and/or intermediate frequencies. RF transceiver 214/224 may also include amplification circuitry to amplify received electrical radio frequency signals, such as power amplifiers (PAs) and/or Low Noise Amplifiers (LNAs). RF transceiver 214/224 may additionally include various transmission circuitry components configured to transmit internally received signals, such as e.g. baseband and/or intermediate frequency signals provided by baseband circuit 216/226, which may include mixing circuitry to modulate internally received signals onto one or more radio frequency carrier waves and/or amplification circuitry to amplify internally received signals before transmission. RF transceiver 214/224 may provide such signals to antenna system 212/222 for wireless transmission. Further references herein to reception and/or transmission of wireless signals by requestor device 210/provider device 220 may thus be understood as an interaction between antenna system 212/222, RF transceiver 214/224, and baseband circuit 216/226 as detailed above.

Requestor device 210/provider device 220 may additionally include baseband circuit 216/226, which may each be respectively composed of baseband control circuit 216a/226a and baseband signal processing circuit 216b/226b. Baseband circuit 216/226 may e.g. a baseband modem or network interface card (NIC). Baseband control circuit 216a/226a may be responsible for controlling radio communications according to a wireless communication protocol, such as WiFi or WiFi Direct in the context of wireless network 200 (or e.g. alternatively another wireless communication protocol in another context). Baseband control circuit 216a/226a may be a Central Processing Unit (CPU) such as a microprocessor (i.e. a single chip implementation of a CPU) or a microcontroller (i.e. a single chip implementation of a CPU, memory (e.g. ROM or RAM), and other peripherals). Baseband control circuit 216a/226a may be configured to control operation of baseband signal processing circuit 216b/226b and RF transceiver 214/224 in accordance with a wireless communication protocol stack by executing program code of software and/or firmware modules of a wireless communication protocol stack. Although not explicitly depicted in FIG. 2, baseband circuit 216/226 may include one or more memory components, either directly integrated with one or both of baseband control circuit 216a/226a and baseband signal processing circuit 216b/226b or provided separately. Baseband control circuit 216a/226a may retrieve the corresponding program code from the one or more provided memory components and execute the program code of the software and/or firmware modules to control baseband signal processing circuit 216b/226b and RF transceiver 214/224 in accordance with control logic provided by various layers of the wireless communication protocol stack, such as Layer 3, Layer 2, and Layer 1 (Physical (PHY) layer), which may include controlling baseband signal processing circuit 216b/226b as PHY layer circuitry of the wireless communication protocol stack in order to transmit and receive wireless communication signals with RF transceiver 214/224 and antenna system 212/222.

Accordingly, requestor device 210 and provider device 220 may operate on wireless network 200 in accordance with the appropriate wireless communication protocol of wireless network 200 through control by baseband circuits 216 and 226, respectively. It is understood that further references to operation of requestor device 210 and provider device 220 in a wireless communication context refer to operations of the various internal components of requestor device 210 and provider device 220 (both explicitly shown in FIG. 2 potentially in addition to any other relevant components, such as audio/video components (e.g. audio transducers including microphone(s) and/or speaker(s)) or an application processor) as controlled by baseband circuits 216 and 226, respectively.

Although not explicitly shown in FIG. 2, requestor device 210 and provider device 220 may each include a host system, which may include various components dependent on the intended respective functionalities of requestor device 210 and provider device 220. For example, a host system for an implementation of requestor device 210 as a digital camera may include an aperture, analog and digital image processing circuitry, image memory, display, user interface controls, flash apparatus, dedicated microprocessor etc., while a host system for an implementation of requestor device 210 as a laptop may include a display, keyboard/mouse and other use interface controls, web camera, loudspeakers, microphones, hard drive, processor core system, etc. The host system may thus include dedicated components of requestor device 210 and provider device 220 designated for a particular user functionality. Requestor device 210 and provider device 220 may in many cases include an application processor (e.g. a dedicated microprocessor for a digital camera, processor core system for a laptop, etc.), which may be implemented as a CPU. The respective application processor(s) of requestor device 210 and provider device 220 may be configured to execute various applications and/or programs of requestor device 210 and provider device 220, such as e.g. applications corresponding to program code stored in a memory component of requestor device 210 and provider device 220 (not explicitly shown in FIG. 2. The respective application processor(s) of requestor device 210 and provider device 220 may also be configured to control one or more respective further components requestor device 210 and provider device 220, such as user input/output devices (display(s), keypad(s), touchscreen(s), speaker(s), external button(s), camera(s), microphone(s), etc.), peripheral devices, memory, power supply, external device interfaces, etc. It is appreciated that baseband circuit 216/226 may be partially or fully integrated with an application processor, such as in an integrated System on Chip (SoC) design, and accordingly at least part of the described functionality of baseband circuit 216/226 may be implemented in an application processor, such as higher layer (e.g. Layer 2 and/or Layer 3) control of a wireless communication protocol.

As shown in FIG. 2, requestor device 210 may include internal power supply 218, which may be a battery or other limited power supply internally contained within requestor device 210. In contrast, provider device 220 may include external power supply 228, which may be an "unlimited" power supply external to provider device 220, such as an AC power supply. Provider device 220 may therefore not be operationally constrained by power usage.

Wireless network 200 may additionally include proxy discovery device 230. Proxy discovery device 230 may include antenna system 232, RF transceiver 234, baseband circuit 236, and power supply 238. Proxy discovery device 230 may be configured as a wireless network access point in order to provide wireless network access to one or more devices (e.g. requestor device 210 and provider device 220), such as a wireless router.

As will be detailed, proxy discovery device may be a radio communication device including a radio transceiver (RF transceiver 234) and a baseband processing circuit (baseband circuit 236) adapted to interact with the radio transceiver to transmit and receive radio signals, the baseband processing circuit configured to collect information of one or more provider devices, receive a proxy request from a requestor device that specifies target criteria for a desired wireless connection of the requestor device, and identify one or more selected provider devices from the one or more provider devices that match the target criteria, transmit a proxy report to the requestor devices that identifies the one or more selected provider devices.

Proxy discovery device 230 may be configured to operate similarly to requestor device 210 and provider device 220, such as by employing antenna system 232, RF transceiver 234, and baseband control circuit 236a and baseband signal processing circuit 236b of baseband circuit 236 to perform wireless communication in accordance with a wireless communication network protocol in an appreciably analogous manner as to counterpart components antenna system 212/222, RF transceiver 214/224, and baseband control circuit 216a/226a and baseband signal processing circuit 216b/226b of requestor device 210/provider device 220 as detailed above. Accordingly, baseband control circuit 236a may retrieve program code for software and/or firmware modules of a wireless communication protocol stack from one or more provided memory components of proxy discovery device 230 (not explicitly depicted in FIG. 2) and execute the program code of the software and/or firmware modules to control baseband signal processing circuit 236b and RF transceiver 224 in accordance with control logic provided by various layers of the wireless communication protocol stack, such as Layer 3, Layer 2, and Layer 1 (Physical (PHY) layer), which may include controlling baseband signal processing circuit 236 as PHY layer circuitry of the wireless communication protocol stack in order to transmit and receive wireless communication signals with RF transceiver 234 and antenna system 232. It is understood that further references to operation of proxy discovery device 230 in a wireless communication context refer to operations of the various internal components of proxy discovery device 230 as controlled by baseband circuit 236.

Proxy discovery device 230 may additionally be provided with external power supply 238, which may be an "unlimited" power supply such as an AC power supply. Proxy discovery device 230 may therefore not be operationally constrained by power usage.

As will be detailed, proxy discovery device 230 may be a radio communication device including a baseband circuit (baseband circuit 236) configured to perform discovery with one or more provider devices to obtain information of the one or more provider devices, the radio communication device further including a radio transceiver (RF transceiver 234) configured to receive a proxy request from a requestor device that specifies target criteria for a desired wireless connection of the requestor device, and transmit a proxy report to the requestor device that identifies a selected provider device of the one or more provider devices that matches the target criteria.

Returning to the interaction of requestor device 210, proxy discovery device 230, and provider device 220, each of requestor device 210, proxy discovery device 230, and provider device 220 may wirelessly exchange data over radio channels 240, 242, and 244. As indicated above, requestor device 210 may seek a specific service, such as in accordance with a desired operation of a host system of requestor device 210, and accordingly may wish to discover proximate devices that offer the specific service.

In order to conserve batter power at power supply 218, requestor device 210 may employ proxy discovery device 230 in order to offload some of the discovery procedure to proxy discovery device 230, which may not be operationally constrained by power supply limitations due to the "unlimited" power supply of external power supply 238.

Figure 3:
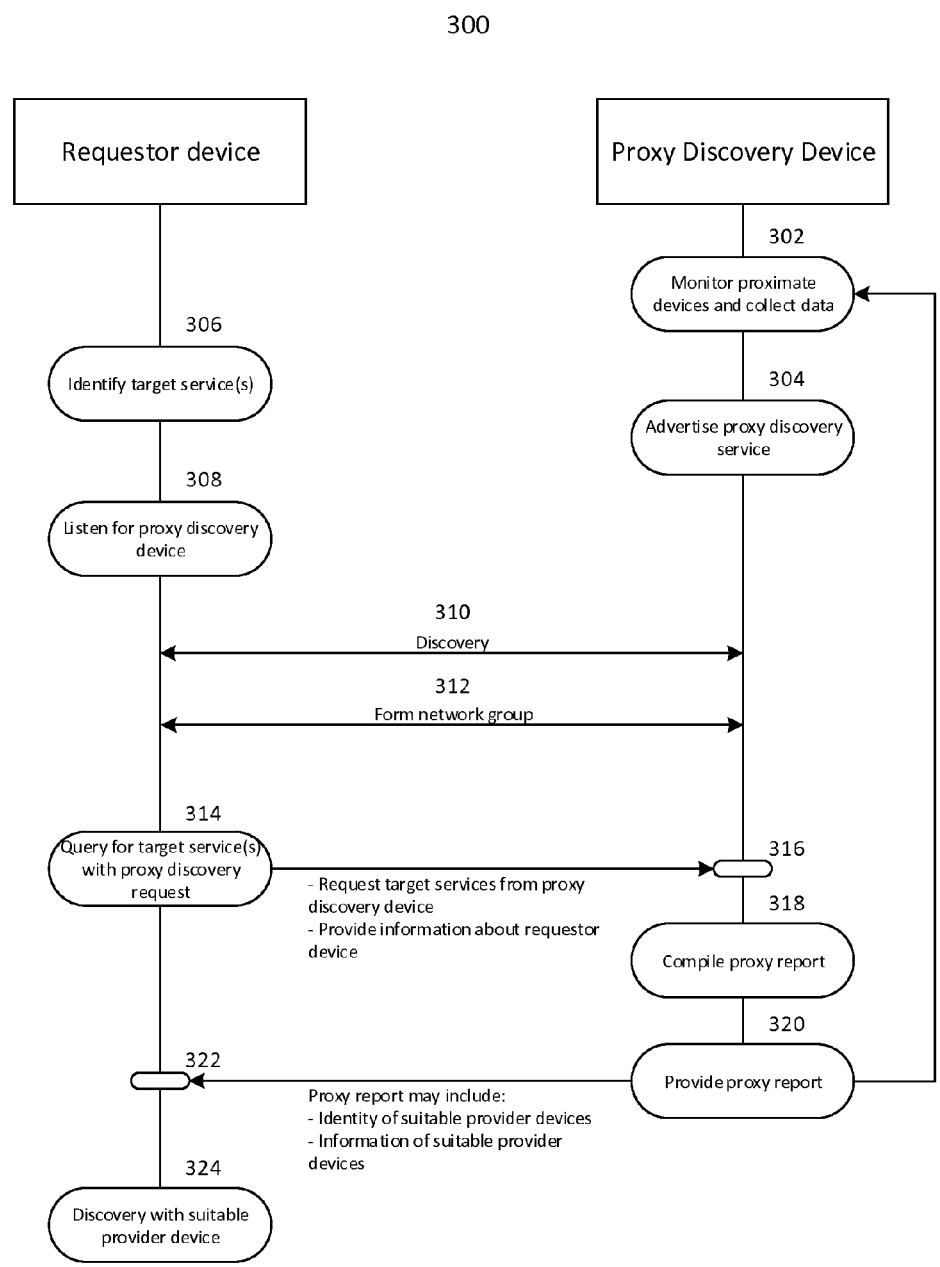
FIG. 3 shows a message sequence chart detailing interaction between a requestor device and a proxy discovery device.

FIG. 3 shows message sequence chart 300 illustrating a general flow of a proxy-assisted discovery procedure between a requestor device (e.g. requestor device 210) and a proxy discovery device (e.g. proxy discovery device 230). The actions performed by both requestor device 210 and proxy discovery device 230 may be controlled by respective baseband control circuits 216a and 236a, which may each employ antenna system 212/232, RF transceiver 214/234, baseband signal processing circuit 216b/236b, and other additional components of requestor device 210/proxy discovery device 230 to perform network communication operations.

As shown in FIG. 3, proxy discovery device 230 may initially monitor for any proximate devices at 302, e.g. both proximate requestor devices and proximate provider devices, and collect any relevant data for each detected device. Such may include performing standard discovery procedures with proximate devices (including e.g. probe requests) and optionally further exchanging information with any discovered devices. Proxy discovery device 230 may "register" each discovered device by exchanging information, either as part of discovery or following discovery by forming a network group to exchange further information, by obtaining information characterizing each discovered device.

For example, proxy discovery device 230 may continuously monitor for any devices advertising on wireless network 200 (e.g. WiFi Direct/P2P, Bluetooth, D2D, WiGig, etc.) by continuously scanning for detectable devices that are advertising using discovery signals.

Proxy discovery device 230 may then register each detected device by performing discovery with each detected device to obtain information about each detected device, such as identifying each detected device (and collecting identification information), determining specific services offered by each detected device (in particular for provider devices), determining specific services requested by each detected device (in particular for requestor devices), determining location information of each detected device (e.g. absolute geographic location or relative location to proxy discovery device 230), determining scheduling information of each detected device (e.g. time and frequency information of the channel employed for discovery by each detected device), determining an activity timestamp (e.g. a timestamp when the device was last detected, which may repeatedly updated) etc. Proxy discovery device 230 may obtain some information simply by reading a discovery signal transmitted by a detected device, as devices broadcasting discovery signals may include such information in the discovery beacon. Alternatively, proxy discovery device 230 may obtain some information by exchanging information with a detected device, such as by exchanging initial information as part of discovery procedures. Alternatively, proxy discovery device 230 may obtain some information by establishing a network connection with a detected device and exchanging further data with the detected device using wireless network protocols, such as by establishing a network group (e.g. a P2P group or other network connection). Proxy discovery device 230 may thus collect data for each detected device. Proxy discovery device 230 may employ a memory component, e.g. a memory component of baseband circuit 236 accessible by baseband control circuit 236a, to store and organize collected data for each detected device.

Proxy discovery device 230 may additionally advertise the proxy discovery service offered by proxy discovery device 230 at 304, such as by advertising the proxy discovery service on a particular channel of wireless network 200. For example, in a WiFi Direct/P2P context, proxy discovery device 230 may advertise a proxy discovery service (which may be defined and integrated into existing WiFi Direct/P2P network protocol) on WiFi Low-Band (LB) Channel 1, which may be one of the three WiFi channels conventionally utilized by devices to advertise themselves. By utilizing a predefined channel, proxy discovery device 230 may allow for expedited discovery, as other devices may be able to skip scanning of other channels to discover proxy discovery device 230 and may instead be able to scan only the predefined channel to discover proxy discovery device 230.

Additionally, proxy discovery device 230 may expedite discovery by advertising specific time frames that a device interested in proxy discovery services may utilize in order to establish the proxy discovery service, e.g. with a dedicated bit or Information Element (IE). A device interested in proxy discovery services may then utilize the specified time frames advertised by proxy discovery device 230 in order to quickly establish a connection with proxy discovery device 230 during the specified time frames, thus allowing for inactive or low-power states in other time frames.

As proxy discovery device 230 may have an "unlimited" power source (or a relatively large-capacity portable power supply compared to requestor device 210), proxy discovery device 230 may not be constrained by power consumption, and thus may be able to continuously monitor for proximate devices and/or advertise proxy discovery services. Accordingly, the probability that a device seeking proxy discovery services will discover proxy discovery device 230 may be increased due to the continuous discoverable presence of proxy discovery device 230.

As shown in FIG. 3, requestor device 210 may identify a target service that is desired by requestor device 210 at 306, such as a target service that is requested or desired by a host system of requestor device 210. For example, requestor device 210 may be a multimedia device with a host system that produces multimedia data, such as a digital camera or a mobile phone with a digital camera. Accordingly, the host system of requestor device 210 may specify that multimedia reproduction (e.g. audio/video playback or image display) is desired by the host system, such as by providing control signaling to baseband circuit 210 that specifies a target service. Alternatively to specifying target services, requestor device 210 may specifically identify a target provider device with appropriate device identification information, such as based on past interactions with specific provider devices.

In order to conserve battery power, requestor device 210 may decide to attempt to utilize proxy discovery services to perform discovery instead of employing standard discovery procedures at requestor device 210. Accordingly, requestor device 210 may begin listening for any available proxy discovery devices at 308, which may include monitoring for available proxy discovery devices using predefined discovery channel information, such as a specific wireless channel (e.g. WiFi LB channel 1) that is designated as available for proxy discovery devices to advertise proxy discovery services.

Assuming proxy discovery device 230 is proximate and available, requestor device 210 may perform discovery with proxy discovery device 230 at 310, which may include using a standard discovery protocol such as Access Network Query Protocol (ANQP) and may depend on the specific wireless protocol of wireless network 200. In order to shorten the required "awake time" of requestor device 210, requestor device 210 may transmit a Probe Request frame in a WiFi context (or similar frame depending on wireless protocol, such as a Bluetooth Low Energy (BLE) Generic Attribute (GATT) Profile in a Bluetooth context) containing a dedicated bit or Information Element (IE) indicating that proxy discovery services are desired, i.e. that requestor device 210 is seeking proxy discovery devices.

After discovery in 310, requestor device 210 and proxy discovery device 230 may form a network group in 312, which may allow requestor device 210 and proxy discovery device 230 to exchange further information. Such may include forming a P2P group in a WiFi context or similar network group depending on the specific wireless protocols of wireless network 200, and may be triggered by requestor device 210.

After establishing a network group with proxy discovery device 230 in 312, requestor device 210 may query target services from proxy discovery device 230 at 314, which may include compiling and transmitting a proxy discovery request to proxy discovery device 230 that specifies one or more target services (i.e. services desired by requestor device 210) in addition to potentially identifying information about requestor device 210, such as location information of requestor device 210, scheduling information of requestor device 210 (i.e. time and frequency information), and/or activity timestamp information. Requestor device 210 may specify the same target services as identified at 306, or may specify different or updated target services. Alternatively, requestor 210 may not specify any target services, and may simply transmit the proxy discovery request to proxy discovery device 230 with the intention of receiving a proxy report detailing all provider devices and all corresponding offered services.

Proxy discovery device 230 may receive the proxy discovery request at 316 and compile a corresponding proxy report at 318. For example, proxy discovery device 230 may utilize previously collected data from detected proximate devices obtained at 302 to compile the proxy report at 318. Specifically, proxy discovery device 230 may compare the one or more target services identified by requestor device 210 in the proxy report to the services offered by the proximate device detected at 302. As previously indicated, proxy discovery device 230 may utilize a memory component to store detected device information from 302.

Proxy discovery device 230 may be configured to provide all detected provider devices in the proxy report, i.e. identify information optionally in addition to other information of each detected provider device. Alternatively, proxy discovery device 230 may perform filtering based on the proxy discovery request received from requestor device 210 at 316, such as by comparing one or more target services specified by requestor device 210 with the services offered by the detected devices. Proxy discovery device 230 may thus identify suitable provider devices for the proxy report, which may be either all detected provider devices or filtered provider devices that offer services matching to the one or more target services.

Additionally or alternatively, proxy discovery device 230 may perform a fresh discovery scan, such as to potentially update the detected device information by discovering any new proximate devices. Proxy discovery device 230 may additionally consider such devices for the proxy report in 318.

In addition to identifying suitable provider devices based on the target services specified by requestor device 210, proxy discovery device 230 may retrieve relevant information about the suitable provider devices, which proxy discovery device 230 may collect and store in 302. For example, proxy discovery device 230 may retrieve location information about the suitable provider devices, such as absolute geographic location or relative location to proxy discovery device 230. Proxy discovery device 230 may additionally retrieve scheduling information of the suitable provider devices, such as time frames during which the suitable provider devices are available for discovery (if such information is available and relatable to requestor device 210) and/or specific carrier channels that the suitable provider devices are using for discovery.

Proxy discovery device 230 may compile the proxy report using such suitable provider device information in 318 and may transmit the proxy report to requestor device 210 at 320.

Requestor device 210 may receive the proxy report at 322, where the proxy report specifies one or more suitable provider devices identified by proxy discovery device 230. Requestor device 210 may then proceed to perform discovery with a (or multiple) suitable provider device based on the suitable provider devices supplied by proxy discovery device 230 in the proxy report. As proxy discovery device 230 may have previously detected and performed discovery with provider devices in 302, requestor device 210 may receive the proxy report at 322 at an earlier time than if requestor device 210 had performed standard discovery procedures without assistance from proxy discovery device. Accordingly, utilization of proxy discovery device 230 may expedite the discovery process in addition to conserving power at requestor devices.

For example, requestor device 210 may identify a suitable provider device, such as provider device 220, that offers a target service of requestor device 210 based on the proxy report, such as the aforementioned exemplary multimedia reproduction or storage services previously discussed. Requestor device 210 may also consider factors such as the location information and activity timestamp information provided in the proxy report for provider device 220, such as by favoring selection of geographically proximate provider devices and/or provider devices that were most recently active (e.g. if multiple suitable provider devices for a particular service are available).

Requestor device 210 may then utilize the proxy report in order to simplify discovery procedures with provider device 220, such as by utilizing any specified scheduling information to expedite discovery. For example, the proxy report may specify a specific time frame and/or carrier channel that is employed by provider device 220 for discovery. Requestor device 210 may then utilize the specified time frame and/or carrier channel to perform discovery in a largely synchronized manner, i.e. by performing discovery during the specified time frame on the specified carrier channel. Such may reduce the awake time required for requestor device 210 to perform discovery. Alternatively to providing a specific time frame for discovery, the proxy report may identify a discovery cycle period, such as e.g. 300 ms, which requestor device 210 may utilize in order to determine the maximum awake time that requestor device 210 will need to utilize to perform discovery. If requestor device 210 does not detect provider device 220 within the discovery cycle period, requestor device 210 may abandon the discovery procedure with provider device 220 as provider device 220 may have gone offline, e.g. is no longer discoverable or available for service.

Requestor device 210 may use established discovery procedures in order to discover provider device 220, which may be enhanced via further applicable information included in the proxy report as detailed above regarding location information, scheduling information, and activity timestamps. Requestor device 210 may thus discover provider device 220. As much of the discovery process is offloaded to proxy discovery device 230, requestor device may conserve power, which may particularly advantageous in the event that requestor device 210 has a finite power supply. As proxy discovery device 230 may have an "unlimited" power source (e.g. AC power supply), proxy discovery device 230 may not be constrained by power limitations, and may be able to perform proximate device monitoring, collecting, and advertisement in 302 and 304 in a largely continuous manner, thus increasing the probability that proxy discovery device 230 will successfully detect all proximate devices. Accordingly, requestor device 210 may receive accurate discovery results (as the proxy report in 322) while minimizing power consumption.

Figure 4:
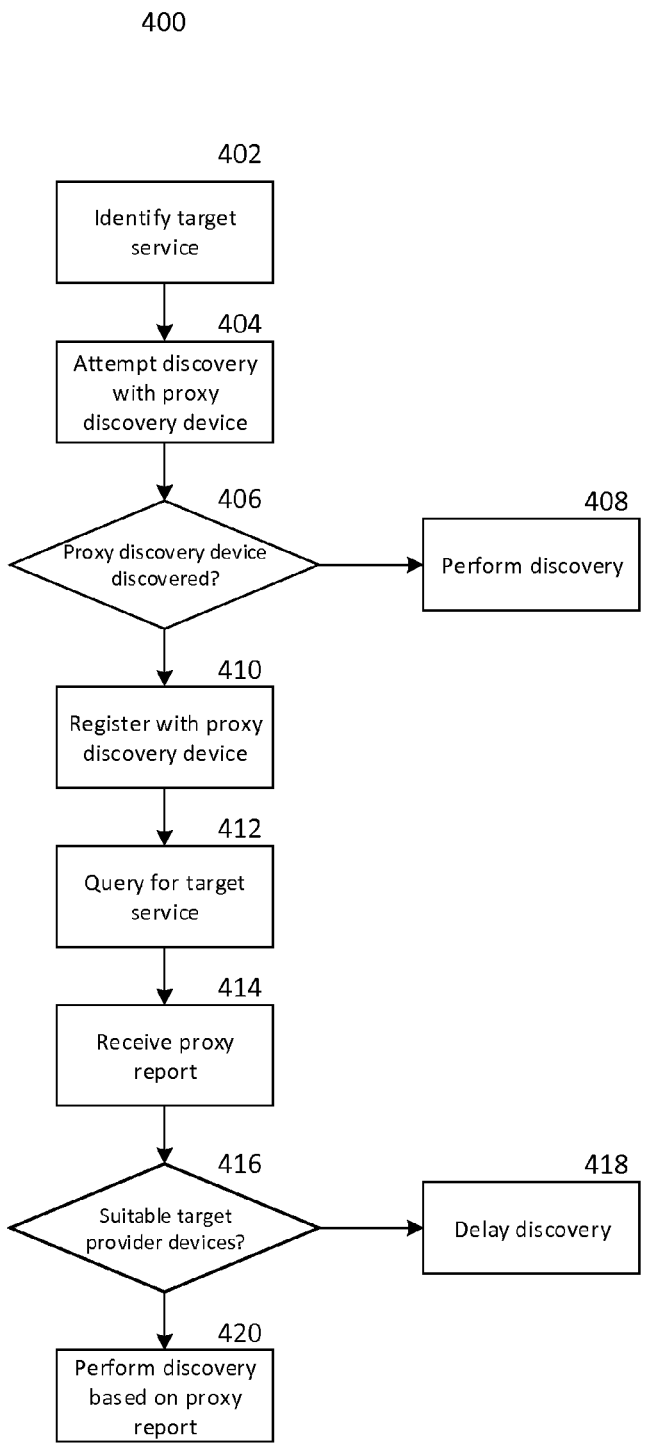
FIG. 4 shows a flow chart illustrating the operation of a requestor device during interaction with a proxy discovery device.

FIG. 4 shows method 400, which a requestor device such as requestor device 210 may perform in order to offload discovery to a proxy discovery device. Similarly to the operations detailed regarding FIG. 4, method 300 may be implemented under the control of a controller such as baseband control circuit 216a, and accordingly may be defined by control logic in a software and/or firmware module executed by baseband control circuit 216a. Requestor device 210 may be able to reduce power consumption by employing method 300, in addition to potentially expediting discovery of suitable provider devices such as provider device 220.

In 302, baseband control circuit 216a may identify a target service that is desired at requestor device 210, such as a target service that is requested or desired by a host system of requestor device 210. For example, requestor device 210 may be a multimedia device with a host system that produces multimedia data, such as a digital camera or a mobile phone with a digital camera. Accordingly, the host system of requestor device 210 may specify that multimedia reproduction (e.g. audio/video playback or image display) is desired by the host system, such as by providing control signaling to baseband circuit 210 that specifies a target service.

Baseband control circuit 216a may then initiate discovery procedures in order to potentially detect any proximate provider devices that provide the target service. As opposed to performing conventional discovery, e.g. by broadcasting a discovery signal and monitoring for discovery signals and discovery responses transmitted by any proximate devices (which may include baseband control circuit 216a controlling baseband signal processing circuit 216b, RF transceiver 214, and antenna system 212 to transmit and receive wireless signals), baseband control circuit 216a may instead employ proxy discovery device 220 to perform detection.

Accordingly, baseband control circuit 216a may attempt to detect proxy discovery device 220 by attempting to perform discovery with proxy discovery device 220 in 304. Baseband control circuit 216a may employ standard discovery procedures to discover proxy discovery device 220, such as standard Access Network Query Protocol (ANQP) discovery or another discovery protocol depending on the specific network protocol employed by wireless network 200.

In order to expedite discovery procedures (thus allowing for reduced power consumption), baseband control circuit 216a may utilize a predefined discovery scheduling information to detect proxy discovery devices, such as specific discovery time windows and/or carrier channels designated for discovery.

If baseband control circuit 216a does not detect any available proxy discovery devices, baseband control circuit 216a may determine that proxy discovery services are not currently available. Requestor device 210 may thus not be able to employ proxy discovery services to conserve power, and accordingly baseband control circuit 216a may perform standard discovery to potentially discover a provider device offering the target service identified in 402.

If baseband control circuit 210 discovers a proxy discovery device in 406, e.g. proxy discovery device 230, baseband control circuit 210 may complete discovery procedures with proxy discovery device 230 and register with proxy discovery device 230 in 410, such as by establishing a network group (e.g. P2P group or other network group allowing communication depending on the particular network protocol of wireless network 200) with proxy discovery device 230.

Baseband control circuit 210 may then query for the target service identified in 402 by transmitting a proxy request to the proxy discovery device in 412, which may specify the target service and/or location information of requestor device 210.

Baseband control circuit 216a may then receive a proxy report from proxy discovery device 230 in 414, where the proxy report may identify all proximate devices detected by proxy discovery device 230 or filtered proximate device detected by proxy discovery device 230, such as only proximate devices that offer the target service. The proxy report may additionally specify location information, activity timestamps, or scheduling information of the suitable provider devices. Based on the information contained in the proxy report, baseband control circuit 216a may select a provider device, e.g. provider device 220 that offers the target service, such as by favoring provider devices that are geographically proximate to requestor device 220 and/or by favoring provider devices that appear to be recently active based on the activity timestamps.

If the proxy report indicates that a suitable proximate device is available at 416, baseband control circuit 216a may proceed to 420 to perform discovery on the selected provider device, e.g. provider device 220. Baseband control circuit 216a may apply the information of the proxy report to perform discovery on provider device 220, such as by applying any relevant scheduling information in the proxy report to select an appropriate time window and/or carrier channel to perform discovery. Baseband control circuit 216a may thus expedite discovery procedures. Baseband control circuit 216a may additionally release the network group with proxy discovery device 230, as proxy discovery services may no longer be needed.

If no suitable provider devices are specified by the proxy report in 416 (e.g. due to no detected devices by proxy discovery device 230 offering the target service or no devices specified in the proxy report satisfying location/activity timestamp criteria), baseband control circuit 216a may not perform discovery, and may instead delay discovery in 418. As no suitable provider devices are immediately available, it may be a waste of power for baseband control circuit 216a to attempt discovery following 416 as no suitable provider devices are likely to be discovered. Accordingly, baseband control circuit 216a may delay discovery until a later time, at which baseband control circuit 216a may perform discovery or may re-query proxy discovery device 230. Baseband control circuit 216a may either maintain the network group with proxy discovery device 230, such as to receive a follow-up proxy report at a later time or may release the network group, thus necessitating a repetition of method 400 at a later time if proxy discovery services are desired.

Accordingly, requestor device 210 may employ proxy discovery device 230 to perform much of the discovery procedure, thus saving considerable power. Requestor device 210 and proxy discovery device 230 may additionally employ scheduling constraints, in particular for proxy report scheduling, in order to further reduce the power consumption penalty of discovery procedures on requestor device 210.

For example, baseband control circuit 216a and baseband control circuit 236a may arrange a specific time window during which proxy discovery device 230 is scheduled to transmit the proxy report to requestor device 210. Accordingly, requestor device 210 may enter a low-power state during other times, and may enter an awake state in order to receive the proxy report. Baseband control circuit 236a may additionally provide a specific carrier channel on which the proxy report is scheduled to be transmitted.

Furthermore, baseband control circuit 216a and baseband control circuit 236a may arrange periodic proxy report transmission, such as periodic proxy report transmission for the duration of time that the network group between requestor device 210 and proxy discovery device 230 remains active. As requestor device 210 may be configured to release the network group in the event that a provider device is selected for discovery, baseband control circuit 236a may be configured to periodically transmit updated proxy reports according to a specific period, which baseband control circuit 216a may utilize in order to re-evaluate whether any suitable provider devices are available. As the proxy report transmissions are periodic according to a set period, baseband control circuit 216a may enter a sleep state during other times when no periodic proxy report transmission is scheduled.

Figure 5:
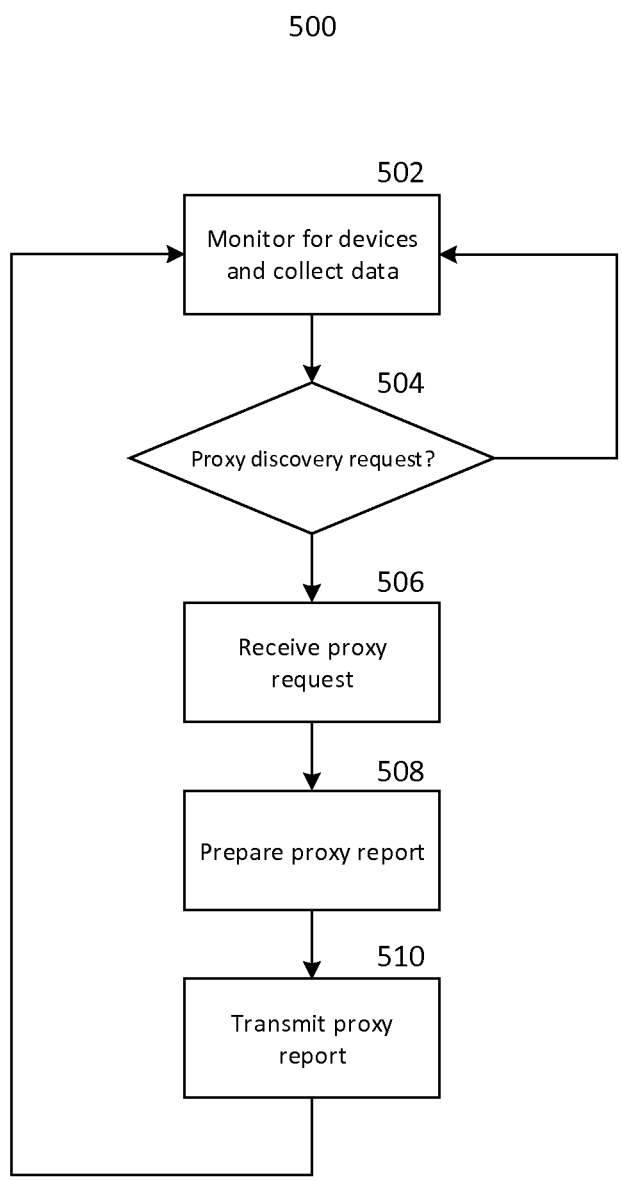
FIG. 5 shows a flow chart illustrating the operation of a proxy discovery device during interaction with a requestor device.

FIG. 5 shows a flow chart illustrating method 500, which may be a counterpart method to method 400, and may be performed at a proxy discovery device such as proxy discovery device 230 under the control of a controller such as baseband control circuit 236a.

Proxy discovery device 230 may offer proxy discovery services through execution of method 500. Similarly to as detailed in FIG. 3, baseband control circuit 236a may monitor for any proximate devices and collect relevant data at 502, such as by reading discovery beacons and/or performing initial discovery procedures with proximate detected devices in order to obtain information for each detected device, such as detected device identity information, offered services of each detected provider device, requested services by each detected requestor device, location information of each detected device, scheduling information of each detected device, activity timestamps of each detected device, etc.

Baseband control circuit 236a may employ various data collection, management, and retrieval operations in 502. For example, baseband control circuit 236a may employ a memory component accessible by baseband control circuit 236a in order to store a data structure for each detected device, which may include data entries for detected device identity information, offered services of each detected provider device, requested services by each detected requestor device, location information of each detected device, scheduling information of each detected device, activity timestamps of each detected device, etc. Baseband control circuit 236a may additionally update entries of each data structure if new information is obtained.

Baseband control circuit 236a may then determine if a request for proxy discovery services is received in 504, such as in a Probe Request frame with a dedicated bit or IE indicating that proxy discovery services are requested. If no proxy discovery service requests are received, baseband control circuit 236a may continue to monitor for proximate devices and collect data in 502.

If a proxy discovery service request is received in 504, baseband control circuit 236a may establish a network group with the requesting baseband control circuit of the requestor device, e.g. baseband control circuit 216a of requestor device 210, and may receive a proxy request in 506 from baseband control circuit 216a. As previously detailed, the proxy request may specify one or more targets services desired by baseband control circuit 216a in addition to information about requestor device 210, such as location or scheduling information.

Baseband control circuit 236a may then compile a proxy report in 508, such as using the detected device data collected in 502. For example, baseband control circuit 236a may utilize the aforementioned memory component in order to select suitable provider devices from the proximate devices detected in 502. Baseband control circuit 236a may retrieve data for each detected provider device for the proxy report, and may compile the proxy report with relevant data stored in the memory component as a data structure for each detected provider device, including detected device identity information, offered services of each detected provider device, requested services by each detected requestor device, location information of each detected device, scheduling information of each detected device, activity timestamps of each detected device, etc. For example, baseband control circuit 236a may include an activity timestamp indicating the last detected availability of each provider device, and/or may determine the distance of each provider device from requestor device 210 based on signal strength measurements (e.g. Received Signal Strength Indicator (RSSI) measurements) or on a calculated distance based on advertised locations, etc.

Baseband control circuit 236a may additionally include location information of proxy discovery device 230 in the proxy report.

Alternatively, baseband control circuit 236a may filter the detected provider devices based on the proxy report, such as by comparing the services offered by each provider device to the target services specified in the proxy request by baseband control circuit 216a. Baseband control circuit 236a may thus compile the proxy report only with provider devices that offer matching services to the target services specified by baseband control circuit 216a. Baseband control circuit 236a may additionally filter the provider devices based on other criteria, such as activity timestamps (e.g. not including provider devices with old activity timestamps in the proxy report) or distance from requestor device 210 (e.g. not including provider devices that are distant from requestor device 210 in the proxy report).

Baseband control circuit 236a may then transmit the proxy report to baseband control circuit 216a in 510. As previously indicated, baseband control circuit 236a may additionally be configured to periodically compile and transmit updated proxy reports, such as based on updated detected proximate devices, e.g. for the duration of time that the network group with baseband control circuit 216a remains active. Upon completion of 510, baseband control circuit 236a may continue monitoring for proximate devices and collecting data in 502 (or may alternatively be configured to continue monitoring for proximate devices and collecting data during 504-510).

Accordingly, requestor devices may employ proxy discovery devices to conserve power and expedite discovery procedures. Such may be particularly advantageous in cases where requestor devices have finite power supplies, such as batteries, as reduced power penalties may extend available usage time.

Proxy discovery device 230 may additionally be extended to discover nearby network access points, such as WiFi Access Points (APs), in addition to proximate provider devices. For example, in 502 proxy discovery device 230 may also scan supported WiFi channels for WiFi APs and similarly collect data on detected WiFi APs, e.g. in addition to other proximate devices.

Proxy discovery device 230 may also receive proxy discovery service requests in 504 and subsequent proxy requests in 506, which may specify target services of a requestor device, e.g. requestor device 210, and/or may request WiFi APs.

Proxy discovery device 230 may then respond to the proxy request by preparing proxy report in 508, which may include all detected provider devices and/or WiFi APs or may filter one or both of the detected provider devices and WiFi APs based on criteria specified by requestor device 210 in the proxy request, such as specific target services or specific types of WiFi APs.

Proxy discovery device 230 may similarly include relevant data to detected WiFi APs in the proxy report, such as identify information of detected WiFi APs, specific type information of detected WiFi APs, activity timestamps of detected WiFi APs, scheduling information of detected WiFi APs, location information of detected WiFi APs, etc. Proxy discovery device 230 may then transmit the proxy report in 510.

Requestor device 210 may be similarly configured in order to request proxy discovery services for WiFi APs, such as by including criteria for WiFi APs in the proxy request in 414 of method 400, receiving a proxy report in 414 specifying suitable detected WiFi APs, and selecting and connecting to a suitable WiFi AP (if available) based on the proxy report in 416-420. Such may be similarly expanded to any of Bluetooth, WiGig, D2D, etc.

Furthermore, proxy discovery device 230 may be configured to additionally or alternatively provide proxy discovery services to provider devices. Although the presence of "unlimited" power supplies in provider devices may result in reduced benefit compared to the finite power supplies of many requestor devices, such an application of proxy discovery services may still be beneficial in reducing power consumption at provider devices.

Specifically, a provider device, e.g. provider device 220, may discover and register with proxy discovery device 230, such as by forming a network group. Provider device 220 may then transmit a proxy request to proxy discovery device 230 that specifies the services offered by provider device 220. Proxy discovery device 230 may receive the proxy request and subsequently perform the advertising portion of the discovery process for provider device 220, such as by continuously advertising the services offered by provider device 220. In the event that a requestor device, e.g. requestor device 210, detects the service advertisement by proxy discovery device 230 and wishes to utilize the offered services, proxy discovery device 230 may provide a proxy report to provider device 220 (which may be at a predetermined time to allow provider device 220 to enter a low power state), which may specify information of requestor device 210, such as the target services, location information, scheduling information, activity timestamps, etc. Proxy discovery device 230 may additionally provide a proxy report to requestor device 210, which may detail the offered services, location information, scheduling information, activity timestamps, etc. of provider device 220. Provider device 220 may then employ the data of the proxy report to discover and connect to requestor device 210, which may optionally also utilize the proxy report provided to requestor device 210 to expedite the connection procedure. Provider device 220 may similarly conserve battery power through the use of proxy discovery device 230, as proxy discovery device 230 may perform continuous advertisement of the offered services of provider device 220 while provider device 220 may enter a low-power state until reception of the proxy report.

Figure 6:
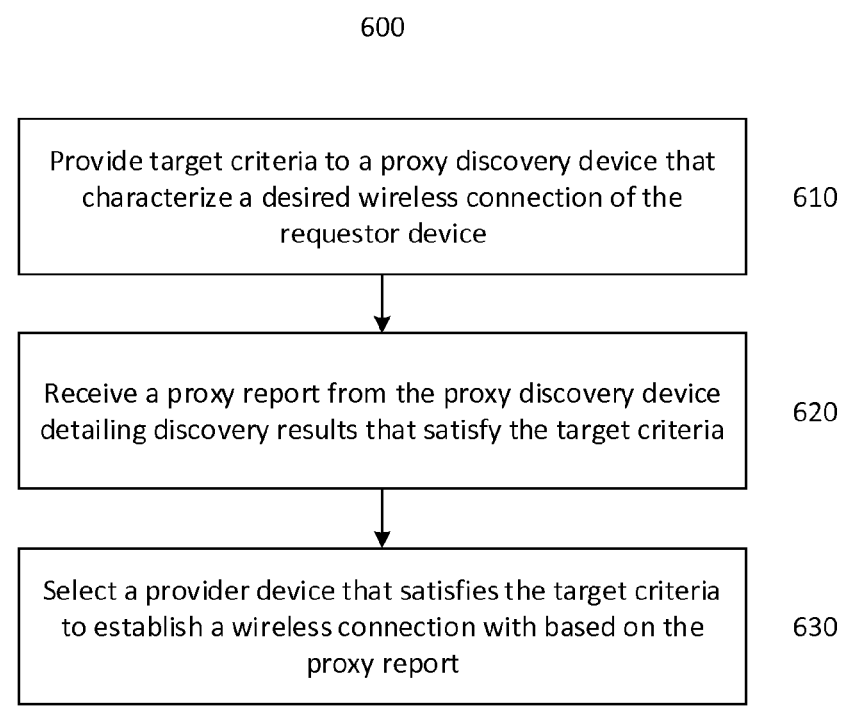
FIG. 6 shows a method for performing wireless communications at a requestor device.

FIG. 6 shows a flow chart illustrating method 600 for performing wireless communications at a requestor device. Method 600 includes providing target criteria to a proxy discovery device that characterize a desired wireless connection of the requestor device (610), receiving a proxy report from the proxy discovery device detailing discovery results that satisfy the target criteria (620), and selecting, based on the proxy report, a provider device that satisfies the target criteria with which to establish a wireless connection (630).

In one or more further exemplary aspects of the disclosure, one or more of the features described above in reference to FIGS. 1-5 may be incorporated into method 600. In particular, method 600 may be configured to perform further and/or alternate processes as detailed regarding requestor device 210.

Figure 7:
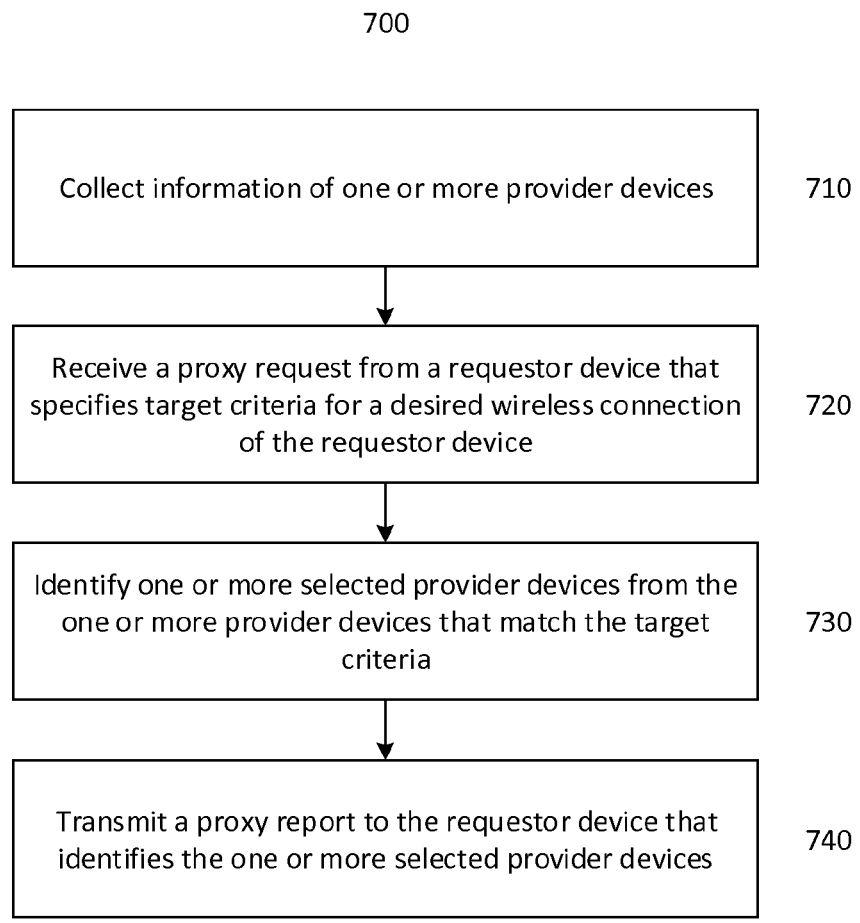
FIG. 7 shows a method for performing wireless communications at a proxy discovery device.

FIG. 7 shows a flow chart illustrating method 700 for performing radio communications at a proxy discovery device. Method 700 includes collecting information of one or more provider devices (710), receiving a proxy request from a requestor device that specifies target criteria for a desired wireless connection of the requestor device (720), identifying one or more selected provider devices from the one or more provider devices that match the target criteria (730), and transmitting a proxy report to the requestor device that identifies the one or more selected provider devices (740).

In one or more further exemplary aspects of the disclosure, one or more of the features described above in reference to FIGS. 1-5 may be incorporated into method 700. In particular, method 700 may be configured to perform further and/or alternate processes as detailed regarding proxy discovery device 230.

Proxy discovery devices may not be limited to devices that only provide proxy discovery services, as a proxy discovery device may additionally be classified as a provider device that offers a proxy discovery service. Furthermore, requestor devices may be configured to offer proxy discovery services for other requestor devices, such as to consolidate discovery procedures from multiple requestor devices into a single "combined" discovery procedure performed at a single requestor device. For example, a first requestor device that seeks to perform discovery may provide a proxy discovery service to a second requestor device, such as by receiving target discovery criteria of the second requestor device, combining the target discovery criteria of the second requestor device with target discovery criteria of the first requestor device and performing a combined discovery procedure. The first requestor device may then provide discovery results to the second requestor device as a proxy report. Such may be useful if both the first and second requestor devices are seeking similar services. Accordingly, devices may act as one or more of a requestor, provider, and proxy discovery device, and may not be limited to only one such role.

It is appreciated that while several above descriptions may detail requestor devices with battery or other finite power supplies, the implementations detailed above may equivalently applied in requestor devices with "unlimited" power supplies, such as in order to reduce the amount of power consumed.

It is appreciated that the terms "user equipment", "UE", "mobile terminal", etc., may apply to any wireless communication device, including cellular phones, tablets, laptops, personal computers, wearables, multimedia playback devices, consumer/home appliances, vehicles, etc., and any number of additional electronic devices capable of wireless communications.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

All acronyms defined in the above description additionally hold in all claims included herein.

The following examples pertain to further aspects of the disclosure:

Example 1 is a method for performing wireless communications at a requestor device, the method including providing target criteria to a proxy discovery device that characterize a desired wireless connection of the requestor device, receiving a proxy report from the proxy discovery device detailing discovery results that satisfy the target criteria, and selecting, based on the proxy report, a provider device that satisfies the target criteria with which to establish a wireless connection.

In Example 2, the subject matter of Example 1 can optionally further include establishing a wireless connection with the provider device.

In Example 3, the subject matter of Example 2 can optionally include wherein establishing a wireless connection with the provider device includes performing discovery with the provider device according to a discovery time window specified by the proxy report or according to a discovery carrier channel specified by the proxy report.

In Example 4, the subject matter of Example 2 or 3 can optionally include wherein establishing a wireless connection with the provider device includes establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

In Example 5, the subject matter of Example 2 can optionally include wherein establishing a wireless connection with the provider device includes performing discovery with the provider device to establish a wireless connection with the provider device.

In Example 6, the subject matter of Example 1 can optionally further include performing discovery to establish a wireless connection with the proxy discovery device, wherein providing target criteria to a proxy discovery device that characterize a desired wireless connection includes transmitting a proxy request specifying the target criteria to the proxy discovery device with the wireless connection.

In Example 7, the subject matter of Example 6 can optionally include wherein receiving a proxy report from the proxy discovery device detailing discovery results that satisfy the target criteria includes receiving the proxy report with the wireless connection.

In Example 8, the subject matter of Example 6 or 7 can optionally include wherein performing discovery to establish a wireless connection with the proxy discovery device includes performing discovery with the proxy discovery device during a predefined discovery time period, or performing discovery with the proxy discovery device on a predefined discovery carrier channel.

In Example 9, the subject matter of Example 6 or 7 can optionally include wherein performing discovery to establish a wireless connection with the proxy discovery device includes performing discovery with the proxy discovery device according to predefined discovery time or according to frequency scheduling information.

In Example 10, the subject matter of Example 1 can optionally include wherein the proxy report includes identity information of one or more provider devices that match the target criteria, and wherein selecting a provider device that satisfies the target criteria with which to establish a wireless connection includes selecting the provider device from the one or more provider devices.

In Example 11, the subject matter of any one of Examples 1 to 10 can optionally include wherein receiving a proxy report from the proxy discovery device detailing discovery results that satisfy the target criteria includes receiving the proxy report from the proxy discovery device during a predefined reception time period, or receiving the proxy report from the proxy discovery device on a predefined reception carrier channel.

In Example 12, the subject matter of any one of Examples 1 to 11 can optionally include wherein selecting a provider device that satisfies the target criteria with which to establish a wireless connection includes selecting a provider device that provides a target service of the requestor device, wherein the target criteria characterize the target service of the requestor device.

In Example 13, the subject matter of Example 12 can optionally further include establishing a wireless connection with the requestor device, and performing the target service with the provider device.

In Example 14, the subject matter of Example 12 or 13 can optionally include wherein the proxy report includes identity information of one or more provider devices that match the target criteria.

In Example 15, the subject matter of any one of Examples 1 to 14 can optionally further include entering a low-power or sleep state for a duration of time between providing the target criteria to the proxy discovery device and receiving the proxy report from the proxy discovery device.

In Example 16, the subject matter of any one of Examples 1 to 15 can optionally further include providing location information of the requestor device to the proxy discovery device.

In Example 17, the subject matter of Example 1 can optionally further include identifying a target service of the requestor device.

In Example 18, the subject matter of Example 17 can optionally include wherein providing target criteria to a proxy discovery device that characterize a desired wireless connection includes indicating the target service in the target criteria.

In Example 19, the subject matter of Example 1 can optionally include wherein the target criteria indicate a target service of the requestor device.

In Example 20, the subject matter of Example 19 can optionally include wherein the target service is an Internet service, a Cloud access service, a printing service, a file sharing service, a multimedia playback service, a data storage service, or a location information service.

In Example 21, the subject matter of Example 1 can optionally include wherein providing target criteria to a proxy discovery device that characterize a desired wireless connection includes transmitting a proxy request to the proxy discovery device that includes the target criteria.

In Example 22, the subject matter of any one of Examples 1 to 21 can optionally include wherein the proxy discovery device has a larger device power capacity than the requestor device.

In Example 23, the subject matter of any one of Examples 1 to 22 can optionally include wherein the proxy discovery device is powered by an external wired power supply and the requestor device is powered by an internal battery power supply.

Example 24 is a mobile communication device including a radio transceiver and a baseband processing circuit, the radio transceiver and the baseband processing circuit configured to perform the method of any one of Examples 1 to 23.

Example 25 is a mobile communication device including a radio transceiver and a baseband processing circuit adapted to interact with the radio transceiver to transmit and receive radio signals, the baseband processing circuit configured to provide target criteria to a proxy discovery device, the target criteria characterizing a desired wireless connection of the mobile communication device, receive a proxy report from the proxy discovery device detailing discovery results that satisfy the target criteria, and select, based on the proxy report, a provider device that satisfies the target criteria with which to establish a wireless connection.

In Example 26, the subject matter of Example 25 can optionally include wherein the baseband processing circuit is further configured to establish a wireless connection with the provider device.

In Example 27, the subject matter of Example 26 can optionally include wherein the baseband processing circuit is configured to establish the wireless connection with the provider device by performing discovery with the provider device according to a discovery time window specified by the proxy report or according to a discovery carrier channel specified by the proxy report.

In Example 28, the subject matter of Example 26 or 27 can optionally include wherein the baseband processing circuit is configured to establish the wireless connection with the provider device by establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

In Example 29, the subject matter of Example 26 can optionally include wherein the baseband processing circuit is configured to establish the wireless connection with the provider device by performing discovery with the provider device to establish a wireless connection with the provider device.

In Example 30, the subject matter of Example 25 can optionally include wherein the baseband processing circuit is further configured to perform discovery to establish a wireless connection with the proxy discovery device, and wherein the baseband processing circuit is configured to provide the target criteria to the proxy discovery device that characterize the desired wireless connection by transmitting a proxy request specifying the target criteria to the proxy discovery device with the wireless connection.

In Example 31, the subject matter of Example 30 can optionally include wherein the baseband processing circuit is configured to receive the proxy report from the proxy discovery device detailing the discovery results that satisfy the target criteria by receiving the proxy report with the wireless connection.

In Example 32, the subject matter of Example 30 or 31 can optionally include wherein the baseband processing circuit is configured to perform discovery to establish the wireless connection with the proxy discovery device by performing discovery with the proxy discovery device during a predefined discovery time period, or performing discovery with the proxy discovery device on a predefined discovery carrier channel.

In Example 33, the subject matter of Example 30 or 31 can optionally include wherein the baseband processing circuit is configured to perform discovery to establish the wireless connection with the proxy discovery device by performing discovery with the proxy discovery device according to predefined discovery time or according to frequency scheduling information.

In Example 34, the subject matter of Example 25 can optionally include wherein the proxy report includes identity information of one or more provider devices that match the target criteria, and wherein the baseband processing circuit is configured to select the provider device that satisfies the target criteria with which to establish the wireless connection by selecting the provider device from the one or more provider devices.

In Example 35, the subject matter of any one of Examples 25 to 34 can optionally include wherein the baseband processing circuit is configured to receive the proxy report from the proxy discovery device detailing discovery results that satisfy the target criteria by receiving the proxy report from the proxy discovery device during a predefined reception time period, or receiving the proxy report from the proxy discovery device on a predefined reception carrier channel.

In Example 36, the subject matter of any one of Examples 25 to 35 can optionally include wherein the baseband processing circuit is configured to select the provider device that satisfies the target criteria with which to establish the wireless connection by selecting a provider device that provides a target service of the mobile communication device, wherein the target criteria characterize the target service of the mobile communication device.

In Example 37, the subject matter of Example 36 can optionally include wherein the baseband processing circuit is further configured to establish a wireless connection with the provider device, and perform the target service with the provider device.

In Example 38, the subject matter of Example 36 or 37 can optionally include wherein the proxy report includes identity information of one or more provider devices that match the target criteria.

In Example 39, the subject matter of any one of Examples 25 to 38 can optionally include wherein the baseband processing circuit or the radio transceiver is further configured to enter a low-power or sleep state for a duration of time between providing the target criteria to the proxy discovery device and receiving the proxy report from the proxy discovery device.

In Example 40, the subject matter of any one of Examples 25 to 39 can optionally include wherein the radio transceiver is further configured to provide location information of the mobile communication device to the proxy discovery device.

In Example 41, the subject matter of Example 25 can optionally include wherein the baseband processing circuit is further configured to identify a target service of the mobile communication device.

In Example 42, the subject matter of Example 41 can optionally include wherein the baseband processing circuit is configured to provide the target criteria to the proxy discovery device that characterize the desired wireless connection by indicating the target service in the target criteria.

In Example 43, the subject matter of Example 25 can optionally include wherein the target criteria indicate a target service of the mobile communication device.

In Example 44, the subject matter of Example 43 can optionally include wherein the target service is an Internet service, a Cloud access service, a printing service, a file sharing service, a multimedia playback service, a data storage service, or a location information service.

In Example 45, the subject matter of Example 25 can optionally include wherein the baseband processing circuit is configured to provide the target criteria to the proxy discovery device that characterize the desired wireless connection includes transmitting a proxy request to the proxy discovery device including the target criteria.

In Example 46, the subject matter of any one of Examples 25 to 45 can optionally further include a power supply, wherein the proxy discovery device has a larger device power capacity than the power supply.

Example 47 is a method for performing radio communications at a proxy discovery device, the method including collecting information of one or more provider devices, receiving a proxy request from a requestor device that specifies target criteria for a desired wireless connection of the requestor device, identifying one or more selected provider devices from the one or more provider devices that match the target criteria, and transmitting a proxy report to the requestor device that identifies the one or more selected provider devices.

In Example 48, the subject matter of Example 47 can optionally include wherein collecting information of one or more provider devices includes performing discovery to discover the one or more provider devices, and receiving the information from the one or more provider devices.

In Example 49, the subject matter of Example 48 can optionally include wherein performing discovery to discover the one or more provider devices includes performing discovery during a predefined discovery time period, or performing discovery on a predefined discovery carrier channel.

In Example 50, the subject matter of any one of Examples 47 to 49 can optionally include wherein collecting information of one or more provider devices includes storing the information of the one or more provider devices until the proxy request is received.

In Example 51, the subject matter of any one of Examples 47 to 50 can optionally include wherein identifying one or more selected provider devices from the one or more provider devices that match the target criteria includes performing a comparison between the information of the one or more provider devices and the target criteria, and identifying the one or more selected provider devices based on the comparison.

In Example 52, the subject matter of any one of Examples 47 to 51 can optionally include wherein identifying one or more selected provider devices from the one or more provider devices that match the target criteria includes identifying the one or more selected provider devices from the one or more provider devices based on at least one of geographic information of the one or more provider devices, discovery timing information of the one or more provider devices, discovery carrier channel information of the one or more provider devices, or an activity timestamp of the one or more provider devices.

In Example 53, the subject matter of any one of Examples 47 to 52 can optionally further include compiling the proxy report, wherein the proxy report indicates at least one of a certain discovery time period utilized by a selected provider device of the one or more selected provider devices or a certain discovery carrier channel utilized by the selected provider device of the one or more selected provider devices.

In Example 54, the subject matter of any one of Examples 47 to 53 can optionally further include compiling the proxy report, wherein the proxy report indicates identity information of a selected provider device of the one or more selected provider devices.

In Example 55, the subject matter of Example 47 can optionally include wherein collecting information of one or more provider devices includes collecting the information of the one or more provider devices before receiving the proxy request from the requestor device.

In Example 56, the subject matter of Example 47 can optionally include wherein collecting information of one or more provider devices includes collecting the information of the one or more provider devices after receiving the proxy request from the requestor device.

In Example 57, the subject matter of Example 56 can optionally include wherein collecting information of one or more provider devices includes collecting information of the one or more provider devices based on the target criteria specified by the proxy request.

In Example 58, the subject matter of any one of Examples 47 to 57 can optionally further include performing discovery with the requestor device to establish a wireless connection with the requestor device.

In Example 59, the subject matter of Example 58 can optionally include wherein performing discovery with the requestor device to establish a wireless connection with the requestor device includes establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

In Example 60, the subject matter of Example 58 or 59 can optionally include wherein performing discovery with the requestor device to establish a wireless connection with the requestor device includes performing discovery with the requestor device during a predefined discovery time period, or performing discovery with the requestor device on a predefined discovery carrier channel.

In Example 61, the subject matter of any one of Examples 58 to 60 can optionally include wherein receiving a proxy request from a requestor device that specifies target criteria for a desired wireless connection of the requestor device includes receiving the proxy request from the requestor device via the wireless connection.

In Example 62, the subject matter of any one of Examples 58 to 61 can optionally include wherein transmitting a proxy report to the requestor device that identifies the one or more selected provider devices includes transmitting the proxy report to the requestor device via the wireless connection.

In Example 63, the subject matter of any one of Examples 47 to 62 can optionally include wherein transmitting a proxy report to the requestor device that identifies the one or more selected provider devices includes transmitting the proxy report to the requestor device during a predefined transmission time period, or transmitting the proxy report to the requestor device on a predefined transmission carrier channel.

In Example 64, the subject matter of any one of Examples 47 to 63 can optionally include wherein the target criteria identify a target service of the requestor device, and wherein identifying one or more selected provider devices from the one or more provider devices that match the target criteria includes identifying one or more matching provider devices of the one or more provider devices that provide the target service as the one or more selected provider devices.

In Example 65, the subject matter of Example 64 can optionally include wherein the target service is an Internet service, a Cloud access service, a printing service, a file sharing service, a multimedia playback service, a data storage service, or a location information service.

In Example 66, the subject matter of any one of Examples 47 to 65 can optionally include wherein the proxy discovery device has a larger device power capacity than the requestor device.

In Example 67, the subject matter of any one of Examples 47 to 66 can optionally include wherein the proxy discovery device is powered by an external wired power supply and the requestor device is powered by an internal battery power supply Example 68 is a radio communication device including a radio transceiver and a baseband processing circuit, the radio transceiver and the baseband processing circuit configured to perform the method of any one of Examples 47 to 68.

Example 69 is a radio communication device including a radio transceiver and a baseband processing circuit adapted to interact with the radio transceiver to transmit and receive radio signals, the baseband processing circuit configured to collect information of one or more provider devices, receive a proxy request from a requestor device that specifies target criteria for a desired wireless connection of the requestor device, and identify one or more selected provider devices from the one or more provider devices that match the target criteria, transmit a proxy report to the requestor devices that identifies the one or more selected provider devices.

In Example 70, the subject matter of Example 69 can optionally include wherein the baseband processing circuit is configured to collect information of the one or more provider devices by performing discovery to discover the one or more provider devices, and receiving the information from the one or more provider devices.

In Example 71, the subject matter of Example 70 can optionally include wherein the baseband processing circuit is configured to perform discovery to discover the one or more provider devices by performing discovery during a predefined discovery time period, or performing discovery on a predefined discovery carrier channel.

In Example 72, the subject matter of any one of Examples 69 to 71 can optionally include wherein the baseband processing circuit is further configured to store the information of the one or more provider devices until the proxy request is received.

In Example 73, the subject matter of any one of Examples 69 to 72 can optionally include wherein the baseband processing circuit is configured to identify the one or more selected provider devices from the one or more provider devices that match the target criteria by performing a comparison between the information of the one or more provider devices and the target criteria, and identifying the one or more selected provider devices based on the comparison.

In Example 74, the subject matter of any one of Examples 69 to 73 can optionally include wherein the baseband processing circuit is configured to identify the one or more selected provider devices from the one or more provider devices that match the target criteria by identifying the one or more selected provider devices from the one or more provider devices based on at least one of geographic information of the one or more provider devices, discovery timing information of the one or more provider devices, discovery carrier channel information of the one or more provider devices, or an activity timestamp of the one or more provider devices.

In Example 75, the subject matter of any one of Examples 69 to 74 can optionally include wherein the baseband processing circuit is further configured to compile the proxy report, wherein the proxy report indicates at least one of a discovery time period utilized by a selected provider device of the one or more selected provider devices or a discovery carrier channel utilized by the selected provider device of the one or more selected provider devices.

In Example 76, the subject matter of any one of Examples 69 to 75 can optionally include wherein the baseband processing circuit is further configured to compile the proxy report, wherein the proxy report indicates identity information of a selected provider device of the one or more selected provider devices.

In Example 77, the subject matter of Example 69 can optionally include wherein the baseband processing circuit is further configured to collect the information of the one or more provider devices by collecting the information of the one or more provider devices before receiving the proxy request from the requestor device.

In Example 78, the subject matter of Example 69 can optionally include wherein the baseband processing circuit is configured to collect the information of the one or more provider devices by collecting the information of the one or more provider devices after receiving the proxy request from the requestor device.

In Example 79, the subject matter of Example 78 can optionally include wherein the baseband processing circuit is configured to collect the information of the one or more provider devices by collecting information of the one or more provider devices based on the target criteria specified by the proxy request.

In Example 80, the subject matter of any one of Examples 69 to 79 can optionally include wherein the baseband processing circuit is further configured to perform discovery with the requestor device to establish a wireless connection with the requestor device.

In Example 81, the subject matter of Example 80 can optionally include wherein the baseband processing circuit is configured to perform discovery with the requestor device to establish the wireless connection with the requestor device by establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

In Example 82, the subject matter of Example 80 or 81 can optionally include wherein the baseband processing circuit is configured to perform discovery with the requestor device to establish the wireless connection with the requestor device by performing discovery with the requestor device during a predefined discovery time period, or performing discovery with the requestor device on a predefined discovery carrier channel.

In Example 83, the subject matter of any one of Examples 80 to 82 can optionally include wherein the baseband processing circuit is configured to receive the proxy request from the requestor device that specifies the target criteria for the desired wireless connection of the requestor device by receiving the proxy request from the requestor device via the wireless connection.

In Example 84, the subject matter of any one of Examples 80 to 83 can optionally include wherein the baseband processing circuit is configured to transmit the proxy report to the requestor device that identifies the one or more selected provider devices by transmitting the proxy report to the requestor device via the wireless connection.

In Example 85, the subject matter of any one of Examples 69 to 84 can optionally include wherein the baseband processing circuit is configured to transmit the proxy report to the requestor device that identifies the one or more selected provider devices by transmitting the proxy report to the requestor device during a predefined transmission time period, or transmitting the proxy report to the requestor device on a predefined transmission carrier channel.

In Example 86, the subject matter of any one of Examples 69 to 85 can optionally include wherein the target criteria identify a target service of the requestor device, and wherein the baseband processing circuit is configured to identify the one or more selected provider devices from the one or more provider devices that match the target criteria by identifying one or more matching provider devices of the one or more provider devices that provide the target service as the one or more selected provider devices.

In Example 87, the subject matter of Example 86 can optionally include wherein the target service is an Internet service, a Cloud access service, a printing service, a file sharing service, a multimedia playback service, a data storage service, or a location information service.

In Example 88, the subject matter of any one of Examples 69 to 87 can optionally include wherein the radio communication device has a larger device power capacity than the requestor device.

In Example 89, the subject matter of any one of Examples 69 to 88 can optionally include wherein the radio communication device is powered by an external wired power supply and the requestor device is powered by an internal battery power supply.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication device comprising a radio transceiver and a baseband processing circuit adapted to interact with the radio transceiver to transmit and receive radio signals, the baseband processing circuit configured to:
provide target criteria to a proxy discovery device, the target criteria characterizing a desired wireless connection of the mobile communication device;
receive a proxy report from the proxy discovery device detailing discovery results that satisfy the target criteria; and select, based on the proxy report, a provider device that satisfies the target criteria with which to establish a wireless connection.

2. The mobile communication device of claim 1, wherein the baseband processing circuit is further configured to:
establish a wireless connection with the provider device.

3. The mobile communication device of claim 2, wherein the baseband processing circuit is configured to establish the wireless connection with the provider device by:
performing discovery with the provider device according to a discovery time window specified by the proxy report or according to a discovery carrier channel specified by the proxy report.

4. The mobile communication device of claim 2, wherein the baseband processing circuit is configured to establish the wireless connection with the provider device by:
establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

5. The mobile communication device of claim 1, wherein the baseband processing circuit is further configured to perform discovery to establish a wireless connection with the proxy discovery device,
and wherein the baseband processing circuit is configured to provide the target criteria to the proxy discovery device that characterize the desired wireless connection by:
transmitting a proxy request specifying the target criteria to the proxy discovery device with the wireless connection.

6. The mobile communication device of claim 5, wherein the baseband processing circuit is configured to perform discovery to establish the wireless connection with the proxy discovery device by:
performing discovery with the proxy discovery device during a predefined discovery time period; or
performing discovery with the proxy discovery device on a predefined discovery carrier channel.

7. The mobile communication device of claim 1 wherein the proxy report comprises identity information of one or more provider devices that match the target criteria, and wherein the baseband processing circuit is configured to select the provider device that satisfies the target criteria with which to establish the wireless connection by:
selecting the provider device from the one or more provider devices.

8. The mobile communication device of claim 1, wherein the baseband processing circuit is configured to receive the proxy report from the proxy discovery device detailing discovery results that satisfy the target criteria by:
receiving the proxy report from the proxy discovery device during a predefined reception time period; or
receiving the proxy report from the proxy discovery device on a predefined reception carrier channel.

9. The mobile communication device of claim 1, wherein the baseband processing circuit is configured to select the provider device that satisfies the target criteria with which to establish the wireless connection by:
selecting a provider device that provides a target service of the mobile communication device, wherein the target criteria characterize the target service of the mobile communication device.

10. A method for performing wireless communications at a requestor device, the method comprising:
providing target criteria to a proxy discovery device that characterize a desired wireless connection of the requestor device;
receiving a proxy report from the proxy discovery device detailing discovery results that satisfy the target criteria; and
selecting, based on the proxy report, a provider device that satisfies the target criteria with which to establish a wireless connection.

11. The method of claim 10, further comprising:
establishing a wireless connection with the provider device.

12. The method of claim 10, wherein selecting a provider device that satisfies the target criteria with which to establish a wireless connection comprises:
selecting a provider device that provides a target service of the requestor device, wherein the target criteria characterize the target service of the requestor device.

13. A method for performing radio communications at a proxy discovery device, the method comprising:
collecting information of one or more provider devices;
receiving a proxy request from a requestor device that specifies target criteria for a desired wireless connection of the requestor device;
identifying one or more selected provider devices from the one or more provider devices that match the target criteria; and
transmitting a proxy report to the requestor device that identifies the one or more selected provider devices.

14. The method of claim 13, further comprising:
performing discovery with the requestor device during a predefined discovery time period; or
performing discovery with the requestor device on a predefined discovery carrier channel.

15. The method of claim 13, wherein the target criteria identify a target service of the requestor device, and wherein identifying one or more selected provider devices from the one or more provider devices that match the target criteria comprises:
identifying one or more matching provider devices of the one or more provider devices that provide the target service as the one or more selected provider devices.

16. A radio communication device comprising a radio transceiver and a baseband processing circuit adapted to interact with the radio transceiver to transmit and receive radio signals, the baseband processing circuit configured to:
collect information of one or more provider devices;
receive a proxy request from a requestor device that specifies target criteria for a desired wireless connection of the requestor device; and
identify one or more selected provider devices from the one or more provider devices that match the target criteria;
transmit a proxy report to the requestor devices that identifies the one or more selected provider devices.

17. The radio communication device of claim 16, wherein the baseband processing circuit is configured to collect information of the one or more provider devices by:
performing discovery to discover the one or more provider devices; and
receiving the information from the one or more provider devices.

18. The radio communication device of claim 16, wherein the baseband processing circuit is further configured to:

store the information of the one or more provider devices until the proxy request is received.

19. The radio communication device of claim 16, wherein the baseband processing circuit is configured to identify the one or more selected provider devices from the one or more provider devices that match the target criteria by:
performing a comparison between the information of the one or more provider devices and the target criteria; and
identifying the one or more selected provider devices based on the comparison.

20. The radio communication device of claim 16, wherein the baseband processing circuit is further configured to compile the proxy report, wherein the proxy report indicates at least one of a discovery time period utilized by a selected provider device of the one or more selected provider devices or a discovery carrier channel utilized by the selected provider device of the one or more selected provider devices.

21. The radio communication device of claim 16, wherein the baseband processing circuit is further configured to perform discovery with the requestor device to establish a wireless connection with the requestor device.

22. The radio communication device of claim 21, wherein the baseband processing circuit is configured to perform discovery with the requestor device to establish the wireless connection with the requestor device by:
establishing a wireless connection with the provider device according to a WiFi Direct radio access technology, a WiFi Peer-to-Peer (P2P) radio access technology, a Bluetooth radio access technology, a Wireless Gigabit Alliance (WiGig) radio access technology, or a Long Term Evolution (LTE) Device-to-Device (D2D) radio access technology.

23. The radio communication device of claim 21, wherein the baseband processing circuit is configured to perform discovery with the requestor device to establish the wireless connection with the requestor device by:
performing discovery with the requestor device during a predefined discovery time period; or
performing discovery with the requestor device on a predefined discovery carrier channel.

24. The radio communication device of claim 16, wherein the baseband processing circuit is configured to transmit the proxy report to the requestor device that identifies the one or more selected provider devices by:
transmitting the proxy report to the requestor device during a predefined transmission time period; or
transmitting the proxy report to the requestor device on a predefined transmission carrier channel.

25. The radio communication device of claim 16, wherein the target criteria identify a target service of the requestor device, and wherein the baseband processing circuit is configured to identify the one or more selected provider devices from the one or more provider devices that match the target criteria by:
identifying one or more matching provider devices of the one or more provider devices that provide the target service as the one or more selected provider devices.

* * * * *